United States Patent [19]

Gontowski

[11] Patent Number: 4,820,935

[45] Date of Patent: Apr. 11, 1989

[54] MULTIPLE FUNCTION DRIVER CIRCUIT

[75] Inventor: Walter S. Gontowski, Thompson, Conn.

[73] Assignee: Cherry Semiconductor Corporation, East Greenwich, R.I.

[21] Appl. No.: 152,643

[22] Filed: Feb. 5, 1988

[51] Int. Cl.[4] .............................................. H02V 9/02

[52] U.S. Cl. .................................. 307/112; 307/157; 315/323; 361/191

[58] Field of Search .................................. 307/34–41, 307/3, 57, 66, 67, 12, 16, 17, 108, 109, 264–268, 311, 157; 361/189–191, 166; 328/67; 315/167, 185 R, 185 S, 323; 363/48; 323/271; 310/316–319, 322, 334; 318/290, 293, 294, 296, 297, 298, 299, 254 R

[56] References Cited

U.S. PATENT DOCUMENTS

| | | | |
|---|---|---|---|
| 3,864,606 | 2/1975 | Watrous | 315/323 X |
| 3,895,265 | 7/1975 | Watrous | 315/323 X |
| 4,045,683 | 8/1977 | Erickson | 307/157 |
| 4,262,320 | 4/1981 | Herron | 361/191 |
| 4,494,049 | 1/1985 | Leitgeb | 318/254 X |
| 4,511,827 | 4/1985 | Morinaga et al. | 318/254 |
| 4,550,659 | 11/1985 | Yamanaga | 361/191 X |
| 4,583,028 | 4/1986 | Angersbach et al. | 318/254 |
| 4,639,735 | 1/1987 | Yamamoto et al. | 310/317 X |
| 4,700,116 | 10/1987 | Inoue et al. | 318/254 |

*Primary Examiner*—William M. Shoop, Jr.
*Assistant Examiner*—Paul Ip
*Attorney, Agent, or Firm*—Robert M. Asher

[57] ABSTRACT

An integrated circuit for driving five external signalling components such as four LEDs and a piezo horn. The integrated circuit includes three pairs of series connected transistors, each pair being connected in parallel to one another. Only three terminals are required for controlling the four LEDs and piezo horn.

10 Claims, 2 Drawing Sheets

MULTIPLE FUNCTION DRIVER CIRCUIT

BACKGROUND OF THE INVENTION

This invention relates to a multiple function driver circuit, in particular one for driving four light emitting diodes and one piezo horn.

In many electronic systems incorporating integrated circuits, the component that is usually the largest contributor to total system manufacturing cost is the integrated circuit itself. The cost of an integrated circuit is based upon several factors including the number of leads and size of the IC plastic assembly. For example, an 8 pin package is less costly than a pin package.

FIG. 1 is a representation of a multiple function circuit of the prior art. In particular, an electronic warning alarm system which selectively flashes light emitting diodes (LEDs) and activates an audible warning transducer (Piezo horn) depending upon the requirements of the control circuit is shown. Additionally, this circuit permits the piezo horn to be converted to a sound to voltage transducer so that it can listen as a microphone to external sounds. Such a system may be useful in applications such as an automobile where the horn may be used as a microphone to listen to the engine while the LEDs are used to indicate diagnoses of problems within the automobile. The prior art circuit includes one transistor for each LED. To turn an LED on, its respective transistor is switched on. Thus, there is a terminal for each one of the four LED drivers. A fifth terminal is provided for operating a piezo horn. The fifth terminal is connected between two transistors which can alternately turn on and off to cause the horn to sound. When both the transistors connected to the fifth terminal are off, the piezo horn can be used as a microphone. Thus, for operating four LEDs and one piezo horn, the prior art circuit required five terminals or five pins on an integrated circuit. The integrated circuit will also require a pin for ground and a control voltage. If two more pins are required for other functions on the control circuit, an eight pin package cannot be used, thus raising the cost of such an integrated circuit.

It is an objective of the present invention to minimize the number of pins required to operate four LEDs and a piezo horn.

SUMMARY OF THE INVENTION

The multi-function circuit of the present invention includes a first switching transistor and a second switching transistor connected in series. Also, a third switching transistor and a fourth switching transistor which are connected in series are connected in parallel with the first and second switching transistors. A first one-way device such as a light emitting diode, is connected in parallel with the first switching transistor and in series with the second switching transistor so that the first one-way device turns o when the second switching transistor turns on. A second one-way device is connected in parallel with the third switching transistor and in series with the fourth switching transistor so that the second one-way device turns on when the fourth switching transistor turns on. A third one-way device is connected in series with the first one-way device and in series with the first switching transistor: A fourth one-way device is connected in series with the third switching transistor and in parallel with the third one-way device A fifth switching transistor is connected in series with the third one-way device and in series with the fourth one way device so that the third one-way device is turned on when the first and fifth switching transistors are on and the second and fourth switching transistors are turned off. Also, the fourth one-way device turns on when the third and fifth switching transistors are on and the second and fourth switching transistors are off. This circuit according to the present invention can be implemented with only three pins on an integrated circuit.

The circuit can further include a sixth switching transistor in series with the fifth switching transistor and a piezo device such as a horn connected in parallel with the fifth switching transistor. While not requiring any more than the three terminals, the piezo device can act as a microphone when all of the switching transistors are off, or it can be activated to produce a sound when the fifth switching transistor alternates with the sixth switching transistor in turning on and off.

Other objects and advantages of the present invention will become apparent during the following description of the presently preferred embodiment of the invention taken in conjunction with the drawings.

DETAILED DESCRIPTION OF THE PREFERRED EMBODIMENT

Figure 1:
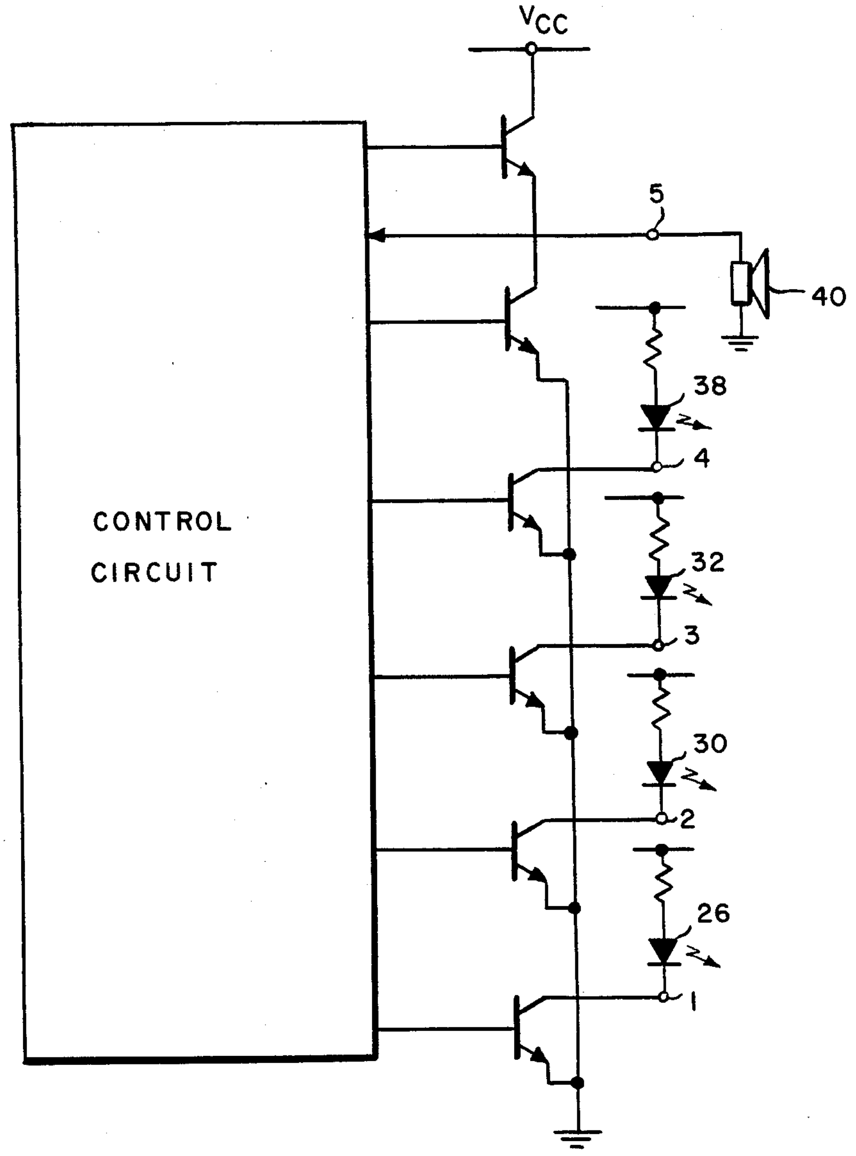
FIG.1 PRIOR ART
FIG. 1 is a schematic block diagram of a multi-function driver of the prior art.
Figure 2:
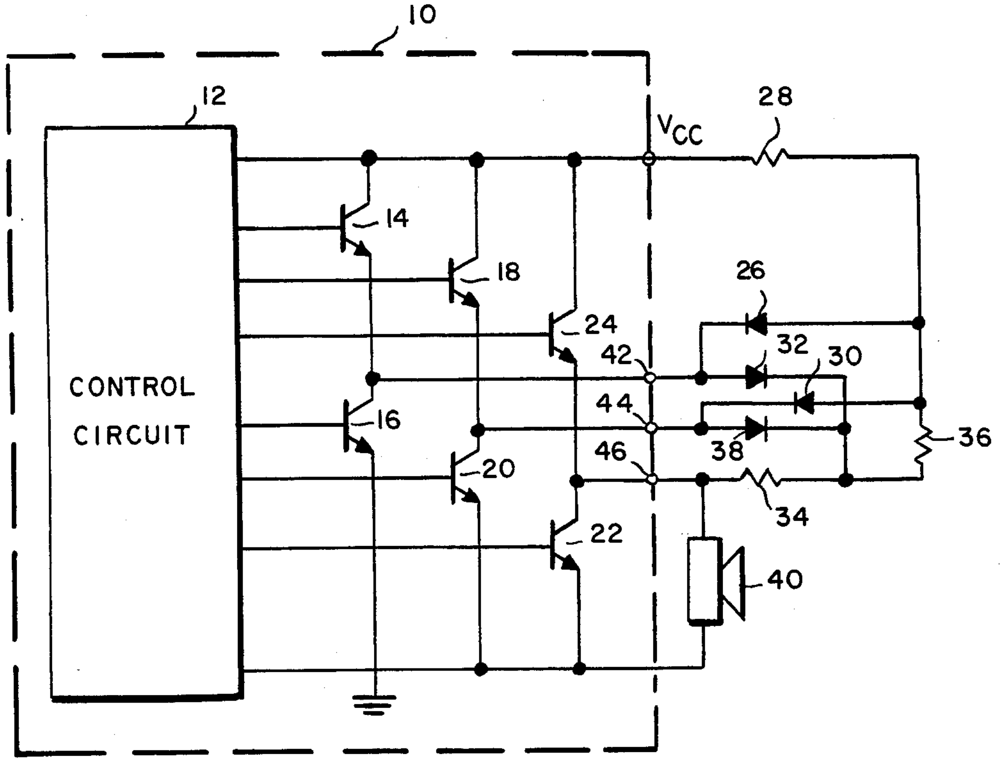
FIG. 2 is a schematic block diagram of the multi-function driver circuit of the present invention.

A multi-function driver integrated circuit 10 is shown in FIG. 2. The integrated circuit 10 includes a control circuit 12 which as in the prior art controls a series of output transistors. The output transistors includes three pairs of switching transistors, each pair including two transistors connected in series and each of the pairs of series connected transistors being connected in parallel with one another. The first pair of switching transistors includes first switching transistor 14 and second switching transistor 16 connected in series. The second pair includes third switching transistor 18 and fourth switching transistor 20. The third pair of switching transistors includes fifth switching transistor 22 and sixth switching transistor 24.

There are three output terminals for driving multiple functions. An output is taken from the emitter to collector connection between each of the pairs of transistors. A first terminal 42 is connected to the first pair of switching transistors 14 and 16. A second terminal 44 is connected to the second pair of switching transistors 18 and 20 and a third terminal 46 is connected between a third pair of switching transistors including the fifth switching transistor 22 and the sixth switching transistor 24.

An arrangement is shown in FIG. 2 for using the integrated circuit and to drive four LEDs and a piezo horn. A first LED 26 is directed towards and connected to the output terminal 42 of the first pair of switching transistors 14 and 16. The anode of LED 26 is connected to a resistor 28 which connects at its other end to the source voltage line. A second LED 30 is directed towards and connected to the output pin 44 from the second pair of switching transistors 18 and 20. The anode of LED 30 also connects to the resistor 28. A third LED 32 is connected to and directed away from the output 42 from the first pair of switching transistors 14 and 16. The cathode of LED 32 is connected to a resistor 34 which is connected to the output pin 46 from the third pair of switching transistors 22 and 24. Resistor 34 is connected in series with a resistor 36 and resistor 28 between the source voltage and the output of the third pair of switching transistors. A fourth LED 38 is connected to and directed away from the second pair of switching transistors 18 and 20. The cathode of LED 38 is connected to the cathode of LED 32 and is thus connected between resistor 36 and resistor 34. A piezo horn 40 is connected between the output of the third pair of switching transistors 22 and 24 and ground.

Figure 3:
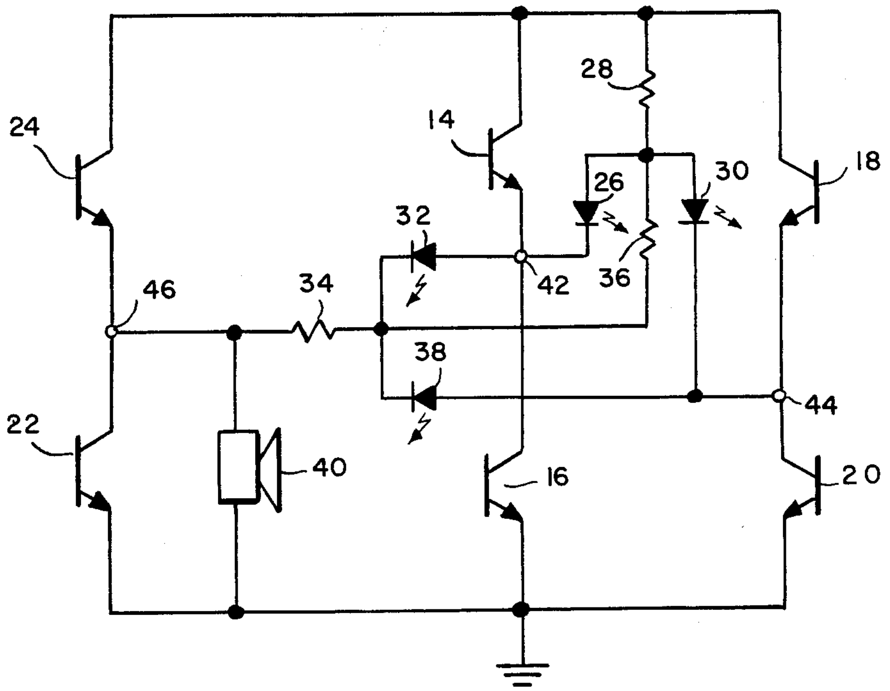
FIG. 3 is a rearranged schematic of the circuit of FIG. 2.

The operation of the circuit of FIG. 2 can be understood more clearly by redrawing the circuit in the form shown in FIG. 3. While the control circuit 12 is not shown it is understood that the control circuit 12 is used to switch on or off as desired any of the switching transistors. In order to turn the first LED 26 on, the second switching transistor 16 is turned on and driven into saturation. This draws current from the source voltage through resistor 28 and LED 26. The remaining five switching transistors are turned off.

In order to turn the 30 on, the fourth switching transistor 20 is turned on while the remaining transistors are off. With the fourth switching transistor 20 in saturation, current is drawn through resistor 28 and the LED 30.

In order to turn the third LED 32 on, first switching transistor 14 and fifth switching transistor 22 are turned on, while the remaining transistors are turned off. Current therefore flows through the first switching transistor 14, the LED 32, the resistor 34 and transistor 22. With first switching transistor 14 in saturation, there is insufficient voltage across the first LED 26 and the resistor 28 to cause any current to flow through the LED 26. Thus, only third LED 32 is lighted.

A similar situation exists for turning on the fourth LED 38. Third switching transistor 18 and fifth switching transistor 22 are turned on. Current flows through the third switching transistor 18, the LED 38, the resistor 34 and the fifth switching transistor 22. With the third switching transistor 18 in saturation, there is insufficient voltage to cause any current flow in second LED 30.

In order to activate piezo horn 40, the first through fourth switching transistors are disabled. The fifth switching transistor 22 and sixth switching transistor 24 alternately switch with one another turning on and off at a tone frequency. For example, a two kilohertz frequency may be used to cause the piezo horn 40 to sound. While it appears that a current path exists for all four of the LEDs when the fifth switching transistor 22 is turned on, the resistor 36 is selected so as to be small enough to limit the voltage across it to an amount insufficient to cause illumination of any of the LEDs.

With all of the switching transistors turned off, the piezo horn 40 acts as a microphone which can be used to detect ambient noise. In accordance with the preferred embodiment of the present invention, the functions of the present circuit can be alternately driven to provide a combination of effects. For example, cycles of operation can be repeated. Each cycle can include an indicator LED lighting up followed by a short period in which the horn 40 operates as a microphone to listen to ambient noise followed by a period in which the horn 40 acts as a speaker and makes a sound. This cycle can be repeated providing a sound to alert a user that a problem exists. Upon viewing the LEDs, the user immediately learns which problem is being indicated.

The integrated circuit of the present invention advantageously provides control of four LEDs and a piezo horn while requiring only three terminals. If this reduction in pin count from the five terminals required in the prior art to the three terminals required by the present invention can reduce the required pins in an integrated circuit from nine or ten to seven or eight, a smaller package may be used resulting in significant cost savings.

Of course, it should be understood that various changes and modifications to the preferred embodiment described above will be apparent to those skilled in the art. For example, the LEDs may be replaced by alternate one-way devices and the piezo horn may be replaced by an alternative piezo element. These and other changes can be made without departing from the spirit and scope of the invention and without diminishing its attendant advantages. It is therefore intended that such changes and modifications be covered by the following claims.

I claim:

1. A multi-function circuit comprising:

a first switching transistor and a second switching transistor connected in series;

a third switching transistor and a fourth switching transistor connected in series and said third and fourth switching transistors being connected in parallel with said first and second switching transistors;

a first one-way device connected in parallel with said first switching transistor and connected in series with said second switching transistor, such that said first one-way device turns on when said second switching transistor turns on;

a second one-way device connected in parallel with said third switching transistor and connected in series with said fourth switching transistor, such that said second one-way device turns on when said fourth switching transistor turns on;

a third one-way device connected in series with said first one-way device and in series with said first switching transistor;

a fourth one-way device connected in series with said third one-way device, in series with said third switching transistor and in parallel with said third one-way device; and a fifth switching transistor connected in series with said third one-way device and in series with said fourth one-way device such that said third one-way device turns on when said first and fifth switching transistors are on and said second and fourth switching transistors are off and such that said fourth one-way device turns on when said third and fifth switching transistors are on and said second and fourth switching transistors are off.

2. The circuit of claim 1 wherein said first, second, third, fourth and fifth switching transistors are included on an integrated circuit having a first terminal connected between said first and second switching transistors, a second terminal connected between said third and fourth switching transistors and a third terminal connected to said fifth switching transistor.

3. The circuit of claim 1 further comprising a piezo element connected in parallel with said fifth switching transistor.

4. The circuit of claim 3 wherein said piezo element acts as a microphone when all of said first, second, third, fourth and fifth switching transistors are off.

5. The circuit of claim 3 further comprising a sixth switching transistor connected in series with said fifth switching transistor and in series with said piezo element such that said piezo element is activated when said fifth switching transistor alternates with said sixth switching transistor in turning on and off.

6. The circuit of claim 5 further comprising a resistance in parallel with said first and third one-way devices and in parallel with said second and fourth one-way devices, said resistance being small enough to avoid allowing current through any of said one-way devices when said piezo element is activated by said fifth switching transistor.

7. A multi-function circuit comprising:

a first switching transistor and a second switching transistor connected in series;

a first terminal connected between said first and second switching transistors;

a third switching transistor and a fourth switching transistor connected in series and said third and fourth switching transistors being connected in parallel with said first and second switching transistors;

a second terminal connected between said third and fourth switching transistors;

a fifth switching transistor and a sixth switching transistor connected in series and said fifth and sixth switching transistors being connected in parallel with said first and second switching transistors;

a third terminal connected between said fifth switching transistor and said sixth switching transistor;

a first one-way device connected to said first terminal so that it is in parallel with said first switching transistor and in series with said second switching transistor,such that said first one-way device turns on when said second switching transistor turns on;

a second one-way device connected to said second terminal so that it is in parallel with said third switching transistor and in series with said fourth switching transistor, such that said second one-way device turns on when said fourth switching transistor turns on;

a third one-way device connected between said first terminal and said third terminal so that said third one-way device turns on when said first and fifth switching transistors are on; and a fourth one-way device connected between said second terminal and said third terminal so that said fourth one-way device turns on when said third and fifth switching transistors are on.

8. The circuit of claim 7 further comprising a piezo element connected to said third terminal so as to be in parallel with said fifth switching transistor.

9. The circuit of claim 8 wherein said piezo element acts as a microphone when all of said first, second, third, fourth, fifth and sixth switching transistors are off.

10. The circuit of claim 9 wherein said piezo element is activated when said fifth switching transistor alternates with said sixth switching transistor in turning on and off.

* * * * *

UNITED STATES PATENT AND TRADEMARK OFFICE

CERTIFICATE OF CORRECTION

PATENT NO. : 4,820,935

DATED : April 11, 1989

INVENTOR(S) : Walter S. Gontowski, Jr.

It is certified that error appears in the above-identified patent and that said Letters Patent is hereby corrected as shown below:

Column 1, line 14, after the word "a", please insert --16--.

Column 1, line 57, please delete "o" and insert --on--.

Column 1, line 67, after the word "device", please insert --.--.

Column 3, line 25, after the first instance of the word "the", please insert --second LED--.

Signed and Sealed this

Fifth Day of December, 1989

*Attest:*

JEFFREY M. SAMUELS

*Attesting Officer* *Acting Commissioner of Patents and Trademarks*